US009626296B2

(12) United States Patent
Gooding

(10) Patent No.: US 9,626,296 B2
(45) Date of Patent: *Apr. 18, 2017

(54) PREFETCH LIST MANAGEMENT IN A COMPUTER SYSTEM

(71) Applicant: International Business Machines Corporation, Armonk, NY (US)

(72) Inventor: Thomas M. Gooding, Rochester, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 154 days.

This patent is subject to a terminal disclaimer.

(21) Appl. No.: 14/336,183

(22) Filed: Jul. 21, 2014

(65) Prior Publication Data
US 2016/0019154 A1    Jan. 21, 2016

Related U.S. Application Data

(63) Continuation of application No. 14/332,103, filed on Jul. 15, 2014.

(51) Int. Cl.
*G06F 12/08* (2016.01)
*G06F 12/0862* (2016.01)
*G06F 9/38* (2006.01)

(52) U.S. Cl.
CPC ........ *G06F 12/0862* (2013.01); *G06F 9/3816* (2013.01); *G06F 2212/1016* (2013.01); *G06F 2212/1021* (2013.01); *G06F 2212/602* (2013.01); *G06F 2212/6024* (2013.01)

(58) Field of Classification Search
CPC ............... G06F 12/0862; G06F 9/3816; G06F 2212/602
See application file for complete search history.

(56) References Cited

U.S. PATENT DOCUMENTS

| 4,791,557 A | 12/1988 | Angel et al. |
| 4,888,679 A | 12/1989 | Fossum et al. |
| 5,860,150 A | 1/1999 | Chiarot et al. |

(Continued)

OTHER PUBLICATIONS

U.S. Appl. No. 14/332,103, entitled Prefetch List Management in a Computer System, filed Jul. 15, 2014.

*Primary Examiner* — Reginald Bragdon
*Assistant Examiner* — Mehdi Namazi
(74) *Attorney, Agent, or Firm* — Patterson + Sheridan, LLP

(57) ABSTRACT

Method and apparatus for tracking a prefetch list of a list prefetcher associated with a computer program in the event the list prefetcher cannot track the computer program. During a first execution of a computer program, the computer program outputs checkpoint indications. Also during the first execution of the computer program, a list prefetcher builds a prefetch list for subsequent executions of the computer program. As the computer program executes for the first time, the list prefetcher associates each checkpoint indication with a location in the building prefetch list. Upon subsequent executions of the computer program, if the list prefetcher cannot track the prefetch list to the computer program, the list prefetcher waits until the computer program outputs the next checkpoint indication. The list prefetcher is then able to jump to the location of the prefetch list associated with the checkpoint indication.

6 Claims, 9 Drawing Sheets

(56) References Cited

U.S. PATENT DOCUMENTS

| | | | |
|---|---|---|---|
| 6,510,494 B1 | 1/2003 | Arimilli et al. | |
| 8,117,390 B2 | 2/2012 | Cummings et al. | |
| 8,185,701 B2 | 5/2012 | Berger et al. | |
| 8,255,633 B2* | 8/2012 | Boyle | G06F 12/0862 711/135 |
| 8,380,680 B2 | 2/2013 | Berger et al. | |
| 8,806,141 B2* | 8/2014 | Boyle | G06F 12/0862 711/137 |
| 2009/0254895 A1* | 10/2009 | Chen | G06F 8/4442 717/161 |
| 2012/0324142 A1* | 12/2012 | Boyle | G06F 12/0862 711/3 |

* cited by examiner

PREFETCH LIST MANAGEMENT IN A COMPUTER SYSTEM

CROSS-REFERENCE TO RELATED APPLICATIONS

This application is a continuation of U.S. patent application Ser. No. 14/332,103, filed Jul. 15, 2014. The aforementioned related patent application is herein incorporated by reference in its entirety.

BACKGROUND

The present invention relates to computer cache memory access, and more specifically, to a robust list prefetch implementation for cache access.

Modern microprocessors contain various data prefetch engines to speed memory access. These engines work by detecting prefetch behavior and attempting to guess the next address that will be demand fetched by cache. The engines will then pull into cache the guessed next memory address, thereby improving the efficiency of memory accesses in situations where the guess was correct.

One type of prefetch engine (also referred to herein as a "prefetcher") is called a list prefetcher. To use a list prefetcher, a first execution of a computer program is run and cache misses (i.e., instances in which data from a memory address requested by the computer program was not stored in cache) are recorded to memory. Upon subsequent executions of the same computer program, the list prefetcher monitors the cache miss activity and attempts to prefetch memory addresses based on the previously-recorded list of historical cache misses.

A shortcoming of the list prefetcher is that it assumes that the memory accesses through multiple executions of the computer program will generally follow the same sequence. Put differently, the list prefetcher assumes that the memory accesses will be essentially the same for each execution of the computer program. However, if the cacheline misses are different in subsequent executions, then the list prefetcher may not be able to use the previously-recorded list of cache miss activity to prefetch information into cache. As a result, the microprocessor may abandon the list prefetcher and resort to a more typical prefetch engine that results in slower overall performance.

SUMMARY

According to one embodiment of the present invention, a prefetch list is generated during a first execution of the computer program, wherein each item in the prefetch list corresponds to cache miss for the computer program. The computer program can generate checkpoint as outputs during execution. Each checkpoint can be associated with a location in the prefetch list. Upon subsequent executions of the computer program and upon determining that the prefetch list is not tracking the subsequent execution, a list prefetcher can wait for the computer program to output a checkpoint indication. The list prefetcher can then track to the location in the prefetch list associated with the output checkpoint indication if the prefetch list is not tracking the memory requests from the computer program. By enabling the list prefetcher to track to a location associated with a checkpoint output by a computer program, a computer does not have to abandon a list prefetch process for a slower prefetch process if the prefetch list is not tracking the memory requests.

According to another embodiment of the present invention, a system can comprise a processor and a memory that includes an application program configured to perform an operation in response to a first execution of the computer program. The operation can include generating a prefetch list, wherein each item in the prefetch list corresponds to a cache miss during a first execution of the computer program. When the computer program outputs a checkpoint indication, the operation can associate the checkpoint indication with a location in the prefetch list. Upon subsequent executions of the computer program and upon determining that the prefetch list is not tracking the second execution of the computer program, the operation can wait for the computer program to output a checkpoint indication and then track to the location in the prefetch list that corresponds to the checkpoint indication.

According to another embodiment of the present invention, a computer program product for tracking a prefetch list can include a computer-readable program code. The program code can generate a prefetch list wherein each item in the prefetch list corresponds to a cache miss during a first execution of a computer program. When the computer program generates a checkpoint indication, the program code can associate the checkpoint indication with a location in the prefetch list. Upon subsequent executions of the computer program and upon determining that the prefetch list is not tracking the computer program, the program code can wait for the computer program to output a checkpoint. The program code can then track to the location in the prefetch list associated with the output checkpoint indication.

DETAILED DESCRIPTION

Figure 1A:
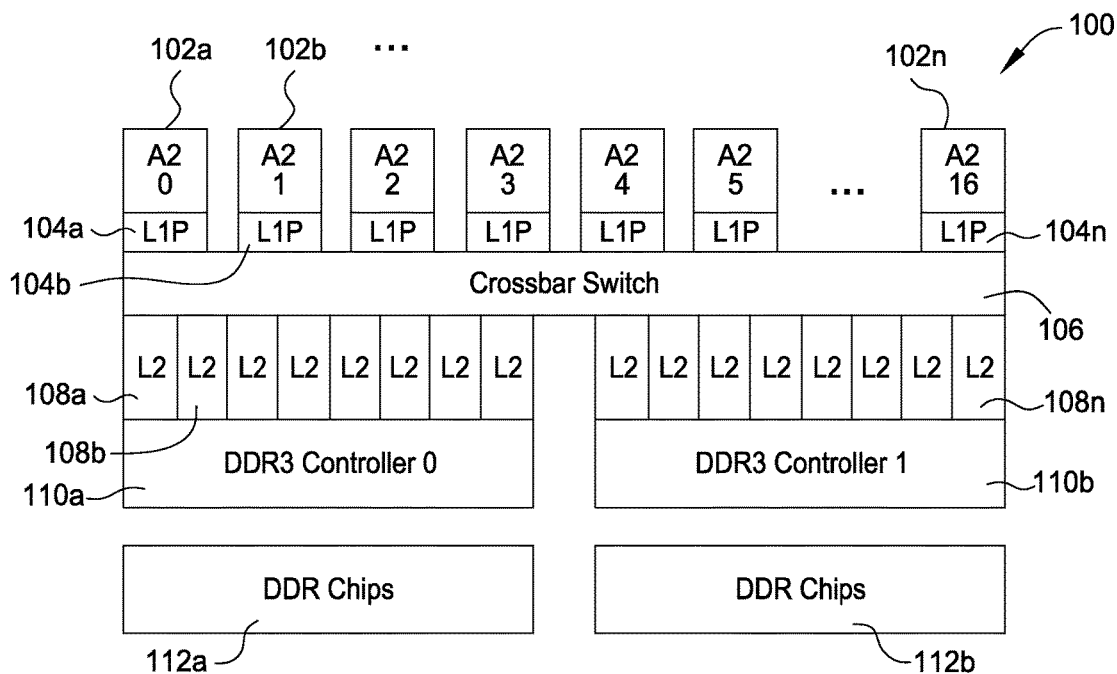
FIG. 1A illustrates an exemplary architecture of computer processors associated with L1 cache, L2 cache, and computer memory.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g. computer programs or list prefetchers) or related data available in the cloud. For example, the list prefetcher could execute on a computing system in the cloud and form a prefetch list and checkpoints for tracking the prefetch list to a computer program. In such a case, the list prefetcher could create checkpoints and store addresses associated with a prefetch list and with the checkpoints at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

With reference now to FIG. 1A, an embodiment of a computer chip module 100 is shown. For example, the computer chip module 100 shown in FIG. 1A can be used in an IBM Blue Gene/Q® computer system. The computer chip module 100 can include a plurality of computer processors 102a-102n, such as IBM Blue Gene/Q PowerPC® A2 core processors. The computer chip module 100 can also include memory chips 112a and 112b. For example, each of the memory chips 112a and 112b can comprise eight gigabytes of DDR3 (double data rate type three) memory. The memory chips 112a and 112b are connected to the computer processors 102a-102n through two levels of cache: L1 cache 104a-104n and L2 cache 108a-108n. A crossbar switch 106 disposed between the L1 cache 104a-104n and the L2 cache 108a-108n can provide for communication between any of the L1 cache 104a-104n (and the respective computer processors 102a-102n) and the L2 cache 108a-108n (and the memory chips 112a and 112b).

The L2 cache 108a-108n can provide memory system caching on the computer chip module 100. Each L2 cache 108a-108n can store a unique subset of physical memory lines from the DDR chips 112a and 112b. The L1 cache 104a-104n can also provide memory system caching on the computer chip module 100. The L1 cache 104a-104n can also act as an interface between the computer processors 102a-102n and the remainder of the computer chip module 100. The L1 cache 104a-104n can run the list prefetcher (and/or other types of prefetcher) and can also store a unique subset of physical memory lines corresponding to the prefetched memory accesses.

The list prefetcher of the L1 cache 104a-104n can use a recorded pattern of memory accesses to effectively prefetch data into the L1 cache 104a-104n and/or the L2 cache 108a-108n for a particular computer program. The computer program running for the first time on the computer processors 102a-102n can train the list prefetcher with specific patterns of memory accesses. When the computer processors 102a-102n execute the same computer program again, the computer program can inform the L1 cache 104a-104n (and the list prefetcher) that the previously-recorded pattern will be reoccurring. As the computer processors 102a-102n re-execute the computer program, the list prefetcher can track the progress of the pattern and attempt to prefetch ahead of the anticipated data.

Figure 1B:
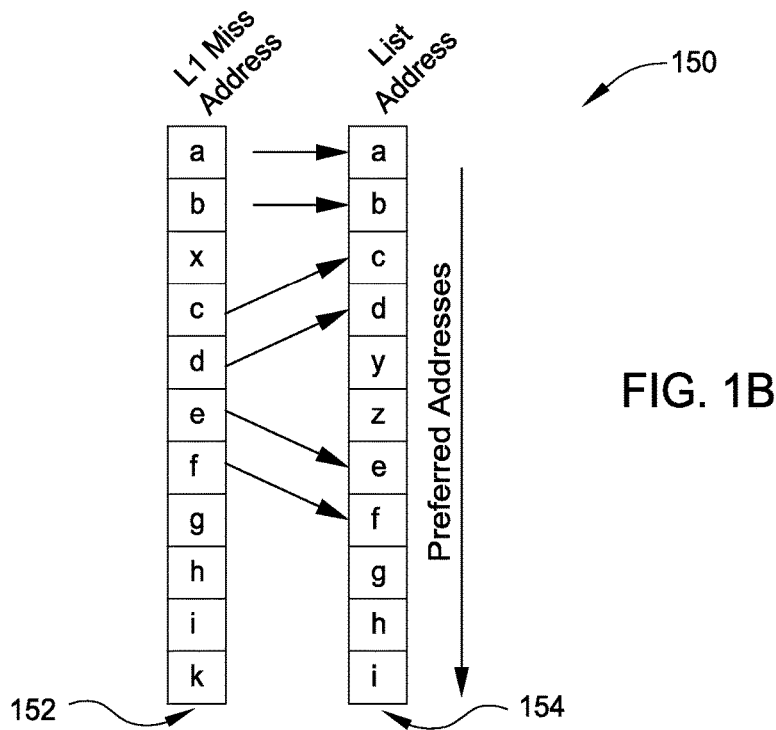
FIG. 1B illustrates an exemplary process in which L1 cache reads partially track a prefetch list.

FIG. 1B illustrates an example operation 150 of a list prefetcher. Column 154 of FIG. 1B illustrates a prefetch list that has been generated as a result of a first execution of a computer program. Column 152 represents memory accesses being requested by the computer processor 102 executing the computer program. The addresses at locations "a" and "b" are forecast by the prefetch list and are available to the process from the L1 cache 104a-104n and/or the L2 cache 108a-108n. The next address at location "x" was not forecast in the prefetch list such that the computer processor 102 will have to access the memory chips 112a and 112b to retrieve the information stored at that address. The next address at location "c" is again expected. The list prefetcher can ignore the rogue address at location "x" and can continue matching the processor 102 memory requests at locations "c" and "d." The next two locations "y" and "z" in the prefetch list are not requested by the processor 102 executing the computer program. Again, the list prefetcher can ignore the rogue addresses at locations "y" and "z" and adjust its list address offset to correspond to location "e."

In some instances, the L1 cache 104a-104n is limited in size and retrieves only a subset of the prefetch list to identify the data to be prefetched. This subset of the prefetch list is also used to synchronize with the memory address requests of the processor 102. For example, the subset of the prefetch list may include twenty four entries. If the memory addresses requested by the computer processor 102 cannot be found in the subset of the prefetch list loaded into the L1 cache, then the computer processor 102 may abandon the list prefetcher and use a less-efficient prefetcher even if the prefetch list could be resumed at a later time.

In various embodiments, checkpoint outputs can be added to a computer program. During the first execution of the computer program, a list prefetcher can associate the checkpoint outputs with locations in the prefetch list (e.g., prefetch list 154). During subsequent executions of the computer program, the list prefetcher can match a checkpoint that is output by the computer program to its associated location in the prefetch list. As a result, if the memory accesses requested by the processor running the computer program diverge from the prefetch list, then the list prefetcher can wait until the computer program outputs the next checkpoint and then jump to the position in the prefetch list associated with the output checkpoint.

Sometimes, subsequent executions of a particular computer program may request different memory addresses than those stored in the prefetch list 204. In certain instances, the prefetcher can compensate for differences between the prefetch list 204 and the memory access requests by a computer program. In certain instances, the list prefetch operation can be paused during execution of portions of the computer program that may cause inconsistent memory accesses from one execution of the computer program to the next. For example, a "walking tree/graph" memory structure can result in data-dependent memory accesses wherein a second memory access depends on an outcome from the computer program based on a first memory access. In other instances in which an expected cache line miss does not occur, the list prefetcher may have limited capability to skip ahead in the prefetch list. For example, referring again to FIG. 1B, if the second execution of the computer program requests memory addresses "a," "b," "x," "c," and then skips "d" to request "e," then the list prefetcher can skip over "d" in the prefetch list 154 to prefetch "e." However, if there are too many memory accesses that do not correspond to the prefetch list 154, then the list prefetcher may not be able to track the memory requests. For example, assuming for illustration purposes that the portion of the prefetch list 154 shown in FIG. 1B represents the portion in cache, if the computer program requests "c" and then skips "d" through "i" to request "j," then the list prefetcher may become lost because the portion of the prefetch list in cache does not include memory address "j." As a result, the computer processor 102 may abandon the list prefetcher and use a less-efficient prefetcher.

Figure 2A:
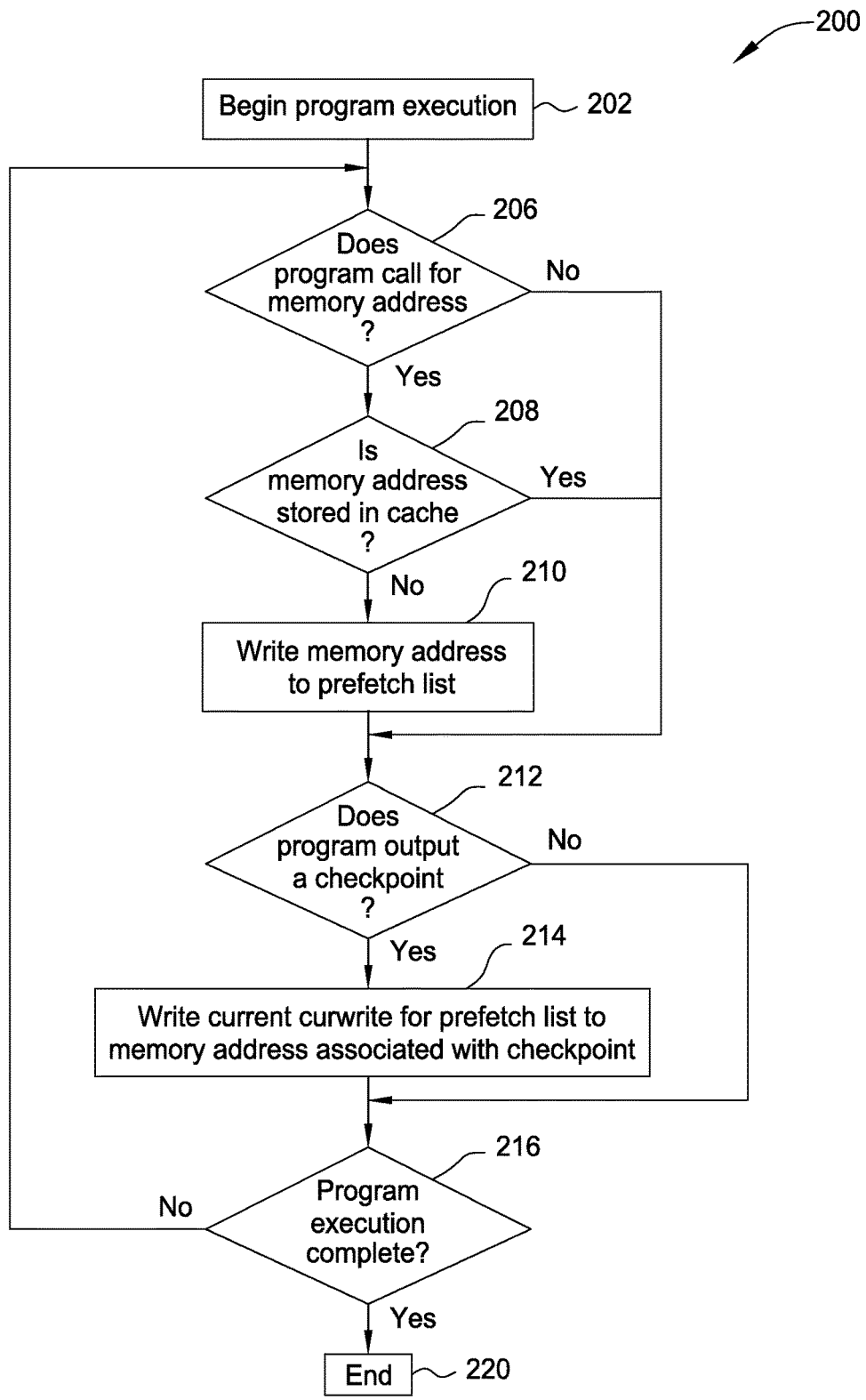
FIG. 2A is a flow chart that illustrates a first process by which a list prefetcher can build a prefetch list with checkpoints for use with a computer program.

Embodiments provide a list prefetcher that can associate checkpoints output by a computer program with locations in a prefetch list. For example, the list prefetcher may generate a prefetch list (e.g., an array of memory addresses used to store a prefetch list) and a a plurality of checkpoints that point to addresses of the prefetch list. For instance, each checkpoint of the plurality of checkpoints can comprise a memory address, and an indication of a location in the prefetch list associated with a particular checkpoint can be written to the memory address. When the computer program outputs a checkpoint, the list prefetcher can write the memory address of the next available space in the prefetch list to the memory address in the separate set that corresponds to the checkpoint. FIG. 2A illustrates a first process 200 by which a list prefetcher can write memory addresses corresponding to locations in a prefetch list to memory addresses corresponding to checkpoints that are output by a computer program. In block 202, a computer program is executed for a first time. In block 206, the list prefetcher determines whether the computer program is requesting data from a memory address. If the computer program does not request data from a memory address, then the process 200 can skip to block 212 to determine whether the computer program has output a checkpoint. Returning to block 206, if the computer program does request data from a memory address, then, in block 208, the list prefetcher can determine whether the data from the requested memory address is stored in cache. If the data from the memory address is not stored in cache, then in block 210, the list prefetcher can write the memory address to the prefetch list. The list prefetcher monitors execution of the computer program for data requests from memory addresses and outputs of checkpoints. Furthermore, if the computer program requests data from a memory address, then it has not output a checkpoint and vice versa. Thus, after writing the requested memory address to the prefetch list in block 210, the query at block 212 (whether the computer program output a checkpoint) can be answered "no" and the process 200 can skip to block 216. Similarly, if the list prefetcher determines that the program is requesting data from a memory address (at block 206) and that the data from the memory address is in cache (i.e., not a cache miss), then the query at block 212 (whether the computer program output a checkpoint) should be answered "no" and the process 200 can skip to block 216. At block 216, the list prefetcher can determine whether the execution of the computer program is complete. If the execution is complete, then the process ends at block 220. If the computer program has not completed executing, then the process 200 returns to block 206 to check for the next memory request or output checkpoint.

If the list prefetcher determines that the computer program has not output a request data from a memory address in block 206, then the process 200 can skip to block 212 to determine whether the computer program has output a checkpoint. If the computer program outputs a checkpoint, then, in block 216, the list prefetcher can write the memory address of the next available space in the prefetch list to a memory address associated with the checkpoint. For example, a curwrite pointer executing in L1 cache (e.g., L1 cache 104a) can include the memory address for the next available space in the prefetch list. After writing the memory address for the next available space in the prefetch list to the memory address associated with the checkpoint that was output by the computer program at block 214, the process 200 can move to block 216 to determine whether the computer program has completed executing. Again, if the computer program has completed executing, then the process 200 ends at block 220. Otherwise, the process 200 returns to block 206, as described above.

Figure 3A:
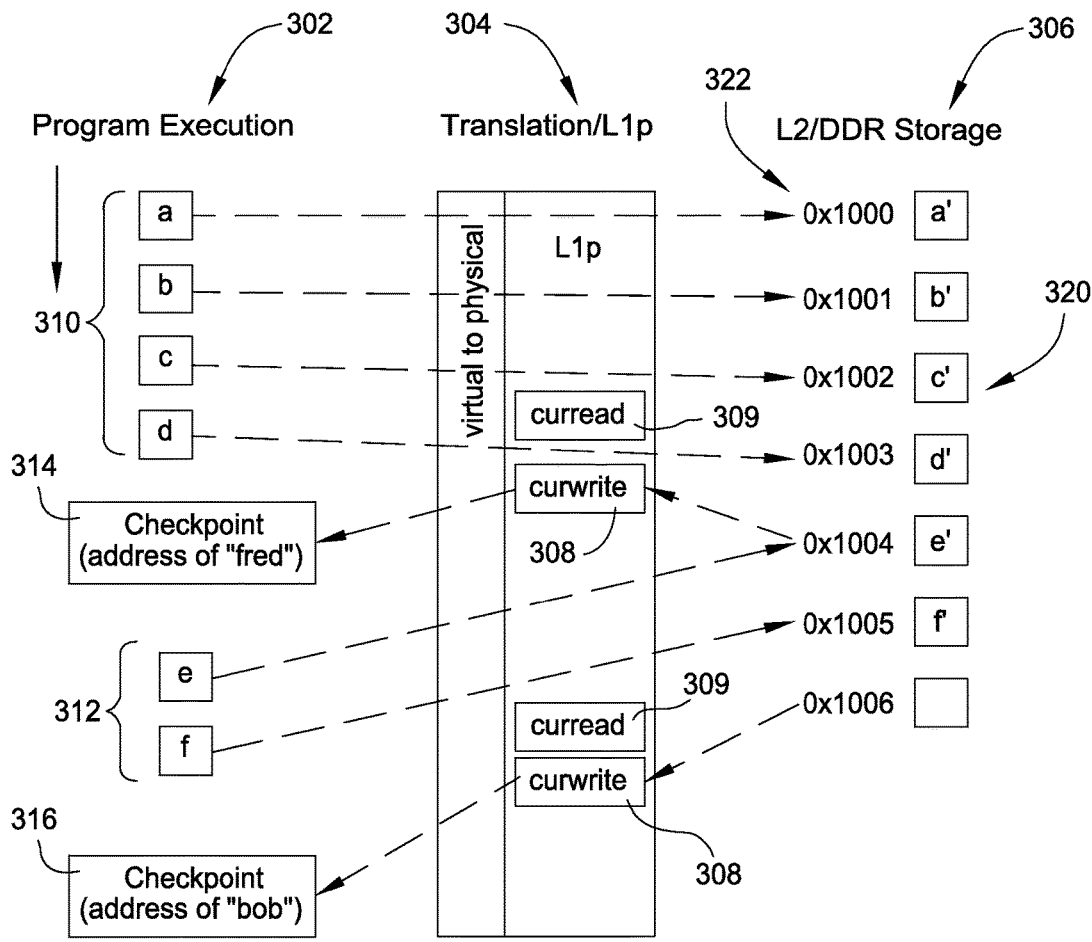
FIG. 3A is a block diagram that shows exemplary write operations to memory addresses associated with a prefetch list and memory addresses associated with checkpoints according to the first process illustrated in FIG. 2A.
Figure 3A:
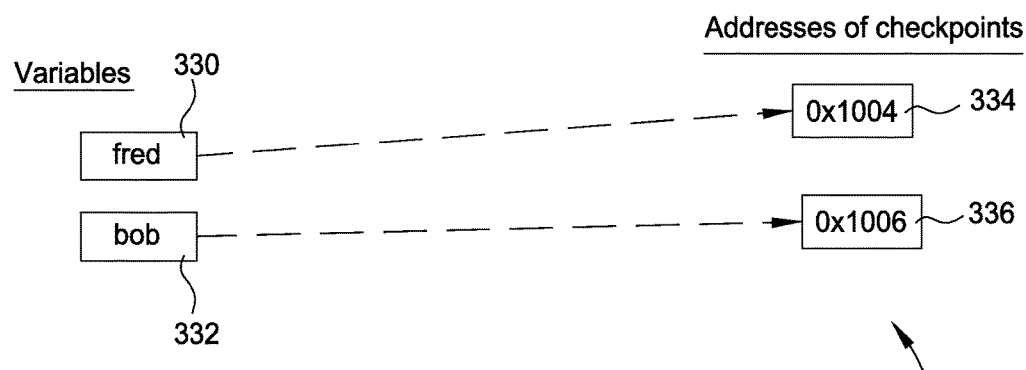

FIG. 3A illustrates a block diagram of writes by a list prefetcher 300 to memory addresses of a prefetch list 320 in L2 memory 306 (e.g., L2 memory 108a) and to memory addresses associated with checkpoints during a first run of a computer program 302 running on a processor (e.g., processor 102a) according to the process illustrated in FIG. 2A. In block 202, the computer program 302 begins executing for the first time. The computer program 302 first requests data from memory address "a." In block 206, the list prefetcher 300 can determine that the computer program 302 is requesting data from a memory address. Thus, moving to block 208, the list prefetcher 300 can determine whether the data from memory address "a" is already written to cache. In this case, the data from memory address "a" is not written to cache, so, in block 210, the list prefetcher 300 can write memory address "a" to the prefetch list 320. The L1 cache 304 (e.g., L1 cache 104a) can translate the virtual memory addresses "a" to a physical address "a'" (the locations in physical memory where the data associated with the virtual memory addresses actually resides). Here, the list prefetcher 300 can write the physical memory address "a'" to memory address 0x1000 in the prefetch list 320. As used herein, memory addresses followed by an apostrophe designate a physical address and memory addresses without an apostrophe designate a virtual memory address.

As described above, after writing memory address "a" to the prefetch list 320, the list prefetcher 300 can skip to block 216 in the process 200. Since the computer program 302 has not completed executing, the process 200 returns to block 206. The computer program next requests data from memory address "b." In block 206, the list prefetcher 300 can determine that the computer program 302 is requesting data from a memory address. Thus, moving to block 208, the list prefetcher 300 can determine whether the data from memory address "b" is already written to cache. In this case, the data from memory address "b" is not written to cache, so, in block 210, the list prefetcher 300 can write memory address "b" to the prefetch list 320. Here, the list prefetcher 300 can write the physical memory address "b'" to memory address 0x1001 in the prefetch list 320. Again, after writing memory address "b" to the prefetch list 320, the list prefetcher 300 can skip to block 216 in the process 200. Since the computer program 302 has not completed executing, the list prefetcher 300 can return to block 206 in the process 200.

The computer program 302 next requests data from memory address "c." In block 206, the list prefetcher 300 can determine that the computer program 302 is requesting data from a memory address. Thus, moving to block 208, the list prefetcher 300 can determine whether the data from memory address "c" is already written to cache. In this case, the data from memory address "c" is not written to cache, so, in block 210, the list prefetcher writes memory address "c" to the prefetch list 320. Here, the list prefetcher 300 can write the physical memory address "c'" to memory address 0x1002 in the prefetch list 320. Again, after writing memory address "c" to the prefetch list 320, the list prefetcher 300 can skip to block 216 in the process 200. Since the computer program 302 has not completed executing, the process 200 returns to block 206. The computer program next requests data from at memory address "d." In block 206, the list prefetcher 300 can determine that the computer program is requesting data from a memory address. Thus, moving to block 208, the list prefetcher 300 can determine whether the data from memory address "d" is already written to cache. In this case, the data from memory address "d" is not written to cache, so, in block 210, the list prefetcher 300 can write memory address "d" to the prefetch list 320. Here, the list prefetcher 300 can write the physical memory address "d'" to memory address 0x1003 in the prefetch list 320. Again, after writing memory address "d" to the prefetch list 320, the process 200 can skip to block 216. Since the computer program 302 has not completed executing, the process 200 returns to block 206.

The computer program 302 next creates a checkpoint 314 that includes a variable. The variable can be anything, but for illustration purposes, the checkpoint 314 includes a variable labeled "fred." The variable "fred" 330 can point to a memory address 334. In block 206, the list prefetcher 300 can determine that the computer program 302 is not requesting data from a memory address. Thus, the list prefetcher 300 can skip to block 212 to determine whether the computer program 302 has output a checkpoint. In block 212, the list prefetcher 300 can determine that the computer program 302 did output a checkpoint and move to block 214 of the process 200. In block 214, the list prefetcher 300 can check the current value of a current write level (curwrite) 308 in the L1 cache 304. The curwrite 308 can indicate the next memory address 322 in the prefetch list 320 that will be written. For example, after storing the physical memory addresses a', b', c', and d' in the prefetch list 320 (described above), the next memory address of the prefetch list 320 to be written can be 0x1004. Thus, the value of curwrite 308 when the computer program 302 outputs the checkpoint 314 will be 0x1004 (also referred to as 1004 herein). After the list prefetcher 300 reads the value of curwrite 308, it can write that value to the address 334 associated with the variable "fred" 330. FIG. 3A shows that the list prefetcher 300 has written address 0x1004 (associated with the prefetch list address 322) into the address 334 associated with the variable "fred" 330. After writing the next address 322 of the prefetch list to the memory address 334 associated with the variable "fred" 330, the list prefetcher 300 can move to block 216 of the process 200 to determine whether the computer program 302 has completed execution. Again, if the computer program 302 has not completed executing, then the list prefetcher 300 returns to block 206.

The computer program next requests data from memory address "e." In block 206, the list prefetcher 300 can determine that the computer program 302 is requesting data from a memory address. Thus, moving to block 208, the list prefetcher 300 can determine whether the data from memory address "e" is already written to cache. In this case, the data from memory address "e" is not written to cache, so, in block 210, the list prefetcher 300 can write memory address "e" to the prefetch list 320. Here, the list prefetcher 300 can write the physical memory address "e'" to memory address 0x1004 in the prefetch list 320. Again, after writing memory address "e" to the prefetch list 320, the process 200 can skip to block 216. Since the computer program 302 has not completed executing, the list prefetcher can return to block 206 of the process 200. The computer program 302 next requests data from information stored at memory address "f." In block 206, the list prefetcher 300 can determine that the computer program 302 is requesting data from a memory address. Thus, moving to block 208, the list prefetcher 300 can determine whether the data from memory address "f" is already written to cache. In this case, memory address "f" is not written to cache, so, in block 210, the list prefetcher 300 can write memory address "f" to the prefetch list 320. Here, the list prefetcher 300 can write the physical memory address "f'" to memory address 0x1005 in the prefetch list 320. Again, after writing memory address "f" to the prefetch list 320, list prefetcher 300 can skip to block 216 in the process 200. Since the computer program 302 has not completed executing, the process 200 returns to block 206.

The computer program next creates a checkpoint 316 that includes a variable. Again, the variable can be any variable. For illustration purposes, the checkpoint 316 includes a variable labeled "bob." The variable "bob" 332 can point to a memory address 336. In block 206, the list prefetcher 300 can determine that the computer program 302 is not requesting data from a memory address. Thus, the list prefetcher 300 can skip to block 212 to determine whether the computer program 302 has output a checkpoint. In block 212, the list prefetcher 300 can determine that the computer program 302 did output a checkpoint and move to block 214 of the process 200. In block 214, the list prefetcher 300 can check the current value of a curwrite (current write level) 308 in the L1 cache 304. The curwrite 308 can indicate the next memory address 322 in the prefetch list 320 that will be written. For example, after storing the physical memory addresses e' and f' (described above), the next memory address to be written can be 0x1006. Thus, the value of curwrite 308 when the computer program 302 outputs the checkpoint 316 will be 0x1006 (also referred to as 1006 herein). After the list prefetcher 300 reads the value of curwrite 308, it can write the value to the address 336 associated with the variable "bob" 332. FIG. 3A shows that the list prefetcher 300 has written address 0x1006 (associated with the prefetch list address 322) into the address 336 associated with the variable "bob" 332. After writing the next address 322 of the prefetch list 320 to the memory address 336 associated with the variable "bob" 332, the list prefetcher 300 can move to block 216 of the process 200 to determine whether the computer program has completed execution. Again, if the computer program has not completed executing, then the list prefetcher returns to block 206. However, for purposes of illustration, if the computer program 302 completes execution after outputting the checkpoint, then the list prefetcher 300 can move to block 220 and end the process 200.

Figure 2B:
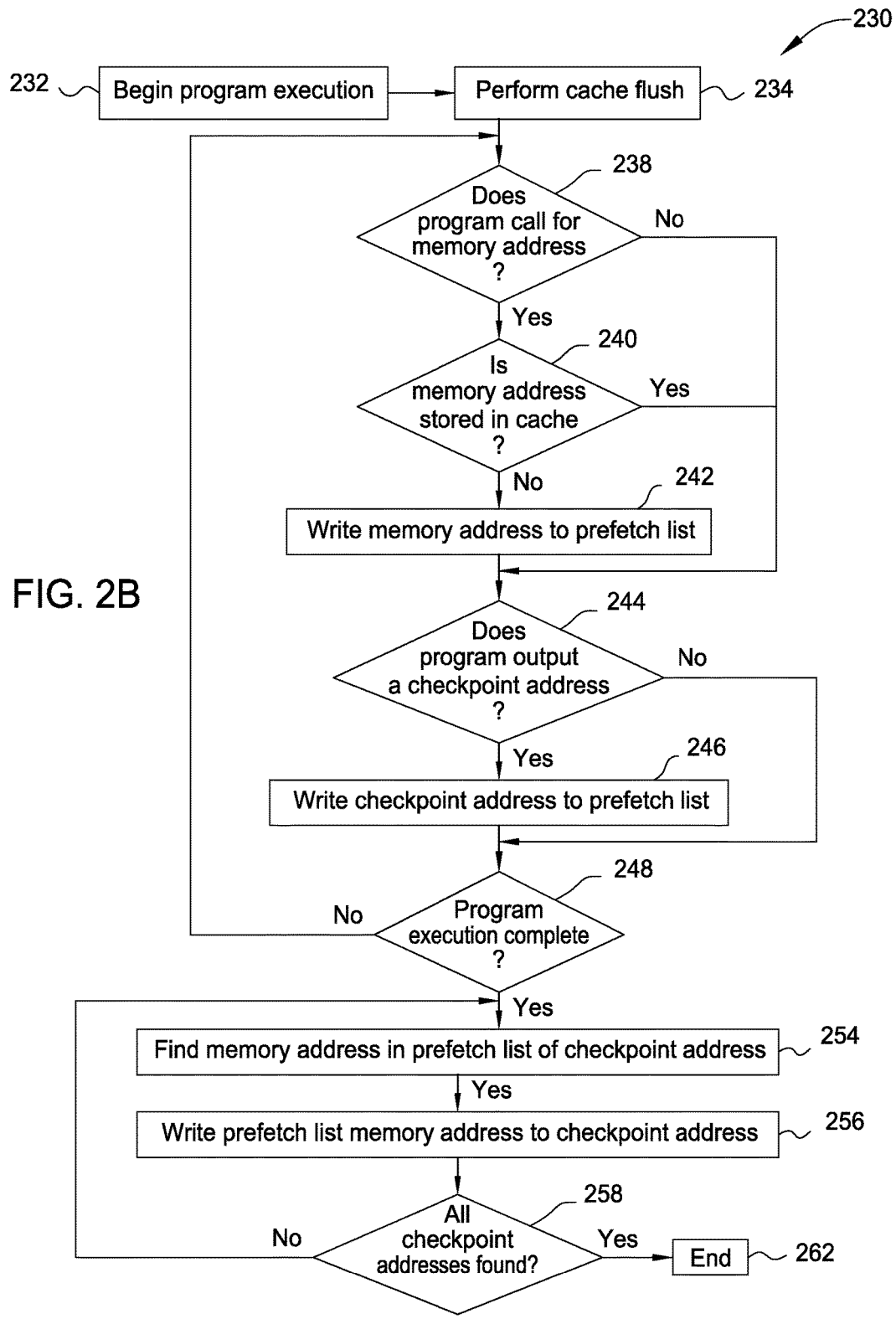
FIG. 2B is a flow chart that illustrates a second process by which a list prefetcher can build a prefetch list with checkpoints for use with a computer program.
Figure 2C:
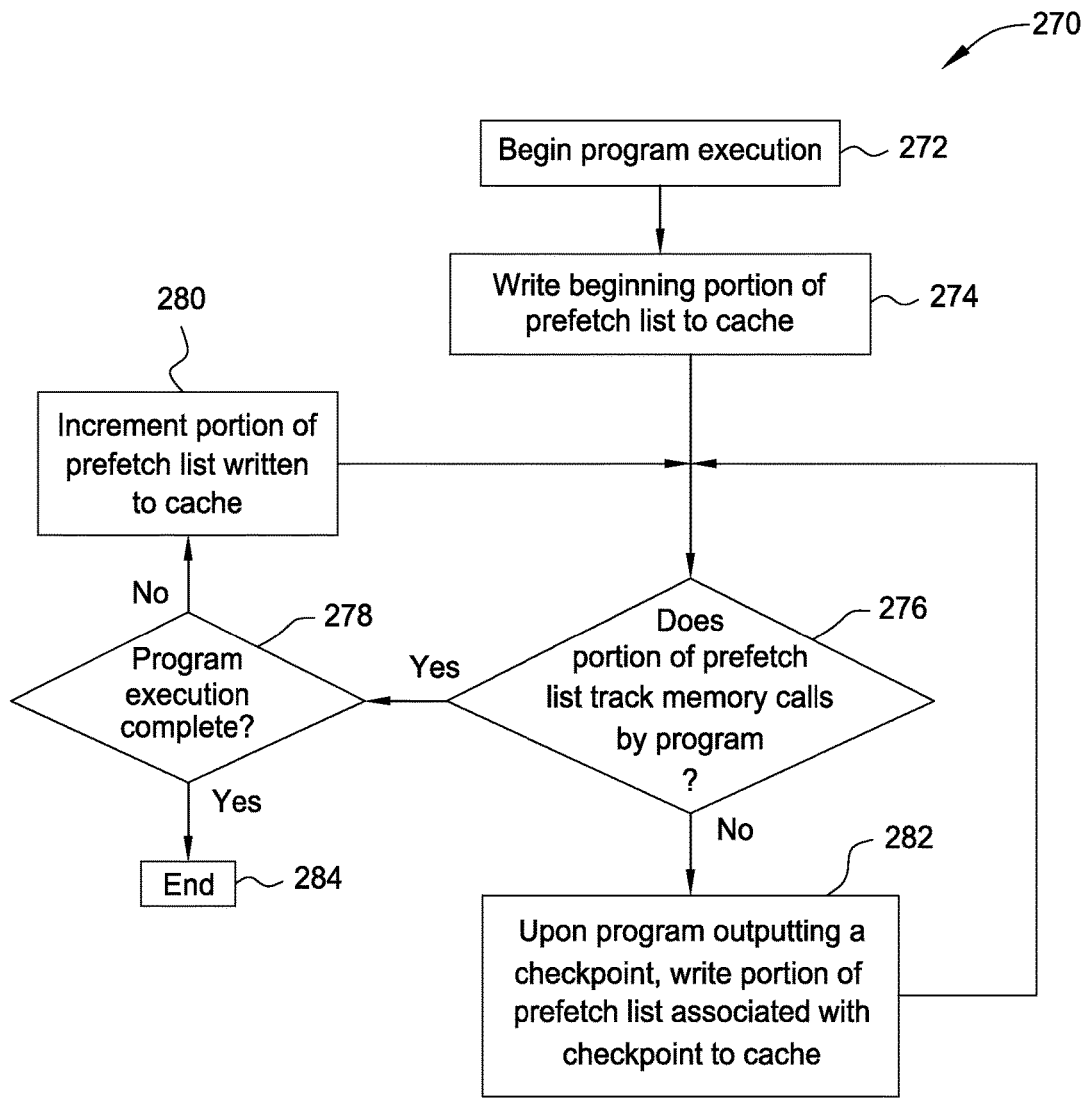
FIG. 2C is a flow chart that illustrates a process for use of a prefetch list with checkpoints to track a computer program.

Referring now to FIG. 2C, in subsequent executions of the computer program 302, the list prefetcher 300 can follow a process 270 to monitor the execution of the computer program 302 to determine whether the prefetch list 320 is tracking the computer program 302. After the computer program 302 begins executing in block 272, the list prefetcher 300 can write the beginning portion of the prefetch list 320 to cache (in block 274). In various embodiments, the list prefetcher 300 can write the beginning portion of the prefetch list 320 to cache (block 274) before the computer program 302 begins executing in block 272 or simultaneously with the computer program 302 beginning execution in block 272. As described above, the cache may not be able to store the entire prefetch list 320. For example, in various embodiments, the cache may only store the first twenty four entries from the prefetch list 320. In block 276, the list prefetcher 300 can determine whether the portion of the prefetch list 320 stored in cache is tracking the memory addresses requested by the computer program 302. Put differently, the list prefetcher determines whether the memory addresses requested by the computer program 302 (for the data stored therein) are in the portion of the prefetch list 320 that has been stored in cache. If the list prefetcher 300 gets lost because the prefetch list 320 does not track the memory addresses requested by the computer program 302, then, in block 282, the list prefetcher 300 can wait for the computer program 302 to output a checkpoint. For example, if the list prefetcher 300 is lost and the computer program outputs the variable "fred" 330, then the list prefetcher 300 can read the memory address 334 associated with "fred" 330. The list prefetcher 300 can see that the memory address 334 is storing the value 0x1004. The list prefetcher 300 can then set the value of current read level (curread) 309 in the L1 cache 304 to 0x1004 so that the curread is again tracking the prefetch list 320. The list prefetcher 300 can also pull into cache a portion of the prefetch list 320 that includes the memory address stored at "fred". For example, the list prefetcher 300 may pull into cache a portion of the prefetch list 320 that begins with the memory address stored at "fred." As another example, the list prefetcher 300 may pull into cache a portion of the prefetch list 320 that includes the memory address stored at "fred" approximately centered within the portion.

Referring again to block 276, if the prefetch list 320 is tracking the memory address requests from the computer program 302, then the list prefetcher 300 can move to block 278 to determine whether the computer program 302 has finished executing. If so, then the process 270 can end at block 284. If the computer program 302 has not finished executing, then the list prefetcher 300 can incrementally adjust the portion of the prefetch list 320 written to cache. For example, as the list prefetcher 300 tracks successive memory address requests from the computer program 302 that are in the prefetch list 320, the list prefetcher 300 can drop the first memory address of the portion of the prefetch list 320 from cache and add the next memory address from the prefetch list 320 to the portion stored in cache. Referring to FIG. 3A for illustration purposes, during such an incremental adjustment, the list prefetcher 300 may drop from cache the memory address 1x1000 from the prefetch list 320 and add the next memory address 1x1007 from the prefetch list to cache.

Figure 3B:
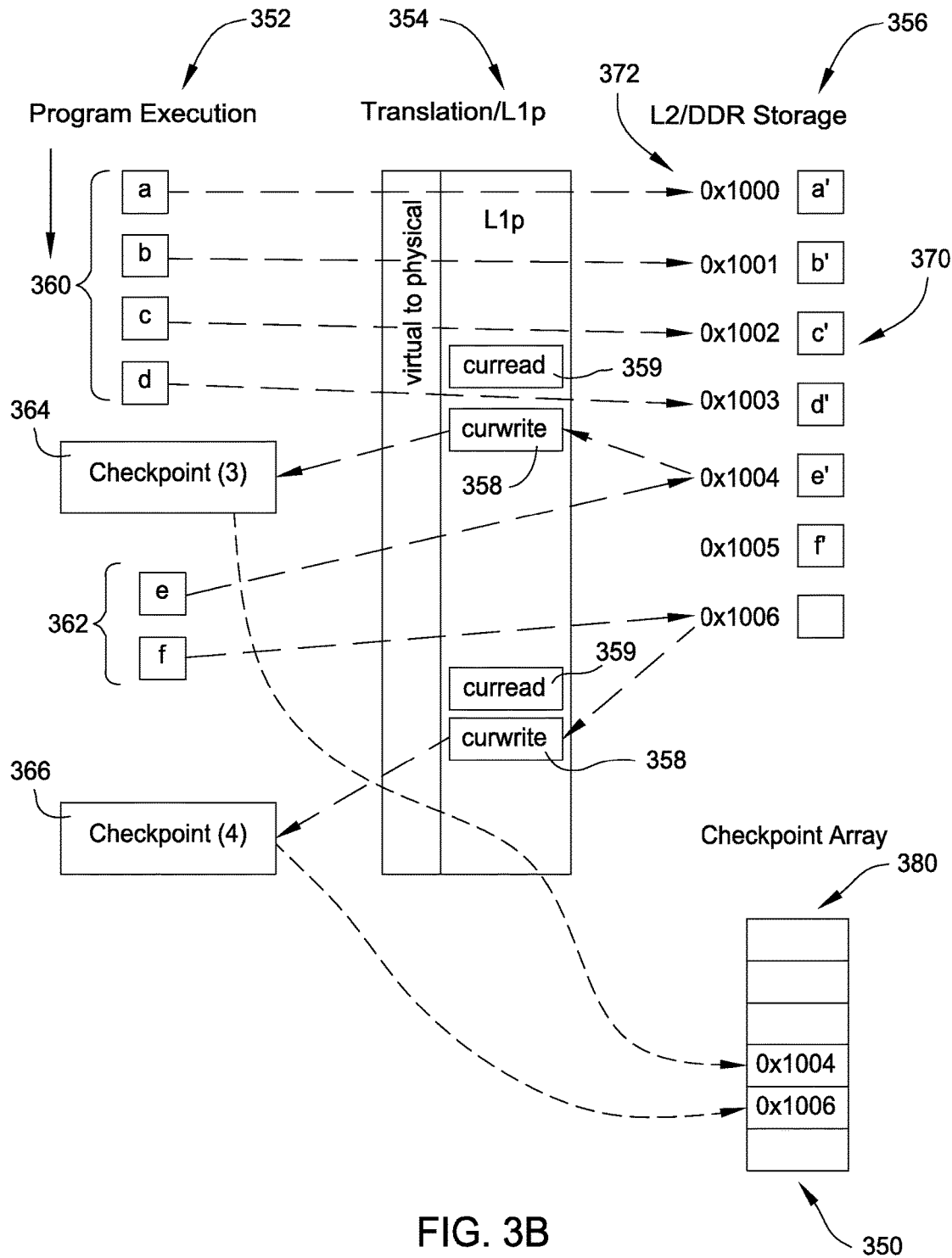
FIG. 3B is a block diagram that shows a variation of exemplary write operations to memory addresses associated with a prefetch list and memory addresses associated with checkpoints according to the first process illustrated in FIG. 2A.

In certain embodiments, the memory addresses associated with checkpoints can be arranged in an ordered array. Referring to FIG. 3B, a tracking array 380 can store memory addresses 372 of a prefetch list 370. The computer program 352 can be programmed to output checkpoints that include an indication of ordering of the checkpoints. For example, the computer program 352 may output a first checkpoint as "checkpoint (0)," a second checkpoint as "checkpoint (1)," a third checkpoint as "checkpoint (2)," and so on. In FIG. 3B, for illustration purposes, the computer program 352 is shown during a first execution, and "checkpoint(0)," "checkpoint (1)," and "checkpoint (2)" have already been created by the computer program 352. After requesting the information stored at virtual addresses a, b, c, and d (described above), the computer program shown in FIG. 3B may output a fourth checkpoint 364 identified as "checkpoint (3)." As described above, for the first execution of the computer program 352, the list prefetcher 350 in these embodiments can read the value of curwrite 358 to get the next memory address 372 to be written to for the prefetch list 370. The memory address 372 from curwrite 308 can be stored in a location of the tracking array corresponding to the indication of ordering of the checkpoint 364. For example, the value of curwrite 308 is 0x1004 when the computer program 352 outputs the fourth checkpoint 364 "checkpoint(3)." Thus, the list prefetcher 350 can store 0x1004 in the fourth line of the tracking array 380. Similarly, the value of curwrite 308 is 0x1006 when the computer program 352 outputs the fifth checkpoint 366 (i.e., "checkpoint (4)"). Thus, the list prefetcher 350 can store 0x1006 in the fifth line of the tracking array 380.

In subsequent executions of the computer program 352, the list prefetcher 350 can monitor the operation of the computer program 352 to ensure that the prefetch list 370 is tracking the computer program 352. If the list prefetcher 350 gets lost (as described above), the list prefetcher 350 can wait for the computer program 352 to output a checkpoint. For example, the computer program may output "checkpoint (3)." The list prefetcher 350 can determine from the ordering indication that this checkpoint corresponds to the fourth line of the tracking array 380. The list prefetcher 350 can look up the memory address 372 of the prefetch list 370 stored in the fourth line of the tracking array 380. In this example, the fourth line of the tracking array 380 is storing the address 0x1004. The list prefetcher 350 can set the value of curread 309 in the L1 cache 354 to 0x1004 so that the curread 309 is again tracking the prefetch list 370. Again, as described above, the list prefetcher 350 can also adjust the portion of the prefetch list 370 pulled into cache so that the address set in curread 309 is included.

Embodiments of a list prefetcher can include a prefetch list (e.g., an array of memory addresses used to store a prefetch list) wherein checkpoint information is stored directly in the prefetch list (rather than in a separate tracking array or the like described above). After a computer program has executed for a first time, the list prefetcher can go through the newly created prefetch list to find where the checkpoint information is stored in the list. These addresses of checkpoint information in the prefetch list can be written to respective addresses associated with the checkpoints. FIG. 2B illustrates a process 230 by which a list prefetcher can, in a first portion of the process, write checkpoints into a prefetch list and, in a second portion of the process, write the locations of the checkpoints in the prefetch list into memory addresses associated with the checkpoints. In block 232, a computer program is executed for a first time. After the computer program begins execution at block 232, the list prefetcher can perform a cache flush at block 234 to remove any instances of checkpoints that may appear in cache (described in greater detail below). In various instances, the cache flush can be performed before the computer program begins execution or concurrently with the program beginning execution. In block 238, the list prefetcher can determine whether the computer program is requesting data from a memory address. If the computer program does not request data from a memory address, then the process 230 can skip to block 244 to determine whether the computer program has output a checkpoint. Returning to block 238, if the computer program does request data from a memory address, then, in block 240, the list prefetcher can determine whether the data from the requested memory address is stored in cache. If the data from the memory address is not stored in cache, then in block 242, the list prefetcher can write the memory address to the prefetch list. As described above, the list prefetcher monitors execution of the computer program for data requests from memory addresses and outputs of checkpoints. Furthermore, if the computer program requests data from a memory address, then it has not output a checkpoint and vice versa. Thus, after writing the memory address to the prefetch list in block 242, the query at block 244 (whether the computer program output a checkpoint) should be answered "no" and the process 230 can skip to block 248. Similarly, if the list prefetcher determines that the program requests data from a memory address (at block 238) and that the memory address is in cache (i.e., not a cache miss) in block 240, then the query at block 244 (whether the computer program output a checkpoint) should be answered "no" and the process 230 can skip to block 248. At block 248, the list prefetcher can determine whether the execution of the computer program is complete. If the execution is complete, then the process can continue to the second portion in block 254 (described below). If the computer program has not completed executing, then the process 230 returns to block 238 to check for the next memory request or output checkpoint.

If the list prefetcher determines that the computer program has not output a request data from a memory address in block 238, then the process 230 can skip to block 244 to determine whether the computer program has output a checkpoint. If the computer program outputs a checkpoint, then, in block 246, the list prefetcher can write information about the checkpoint to the next available space in the prefetch list. For example, the checkpoint can output a variable name associated with a memory address. Due to the cache flush (block 234), any information stored at the memory address associated with the variable name is not in cache, so the list prefetcher can write the variable name to the next memory address in the prefetch list. After the memory address associated with the checkpoint variable name is written to the prefetch list, the process 230 can move to block 248 to determine whether the computer program has completed executing. Again, if the computer program has completed executing, then the process 230 moves to the second portion of the process 230, starting at block 254. Otherwise, the process 230 returns to block 238, as described above.

After the program has completed executing (block 248), the list prefetcher can review the prefetch list to determine the location of checkpoint variables in the list. In block 254, the list prefetcher can find a first checkpoint variable in the prefetch list. Then, in block 256, the list prefetcher can write the memory address from the prefetch list that is associated with the first checkpoint to the memory address associated with the checkpoint variable. In block 258, if all of the checkpoint variables have not been found in the prefetch list, then the process 230 returns to block 254 to process the next checkpoint variable. After all of the checkpoint addresses have been found, the process ends at block 262.

Figure 4A:
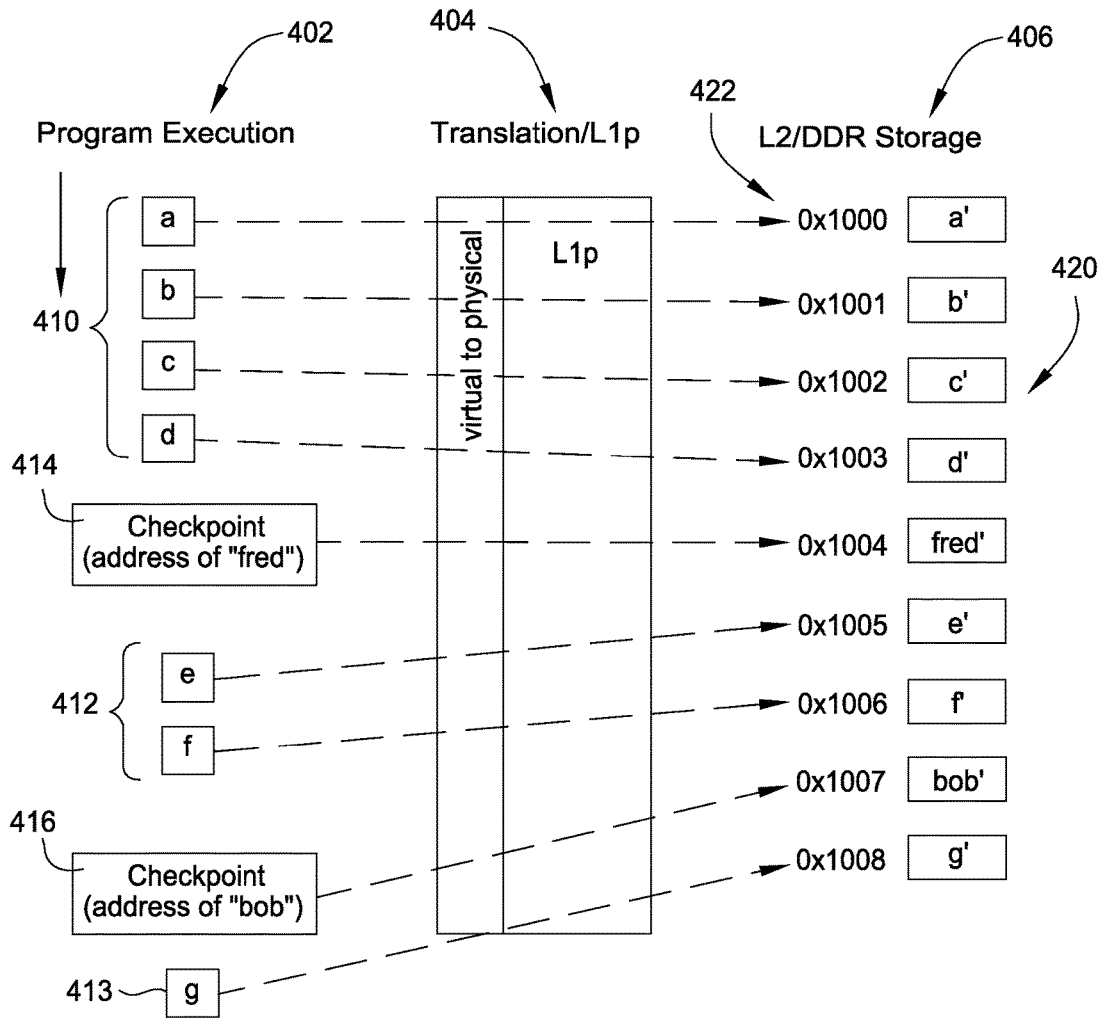
FIG. 4A is a block diagram that shows exemplary write operations to memory addresses associated with a prefetch list according to the second process illustrated in FIG. 2B.
Figure 4A:
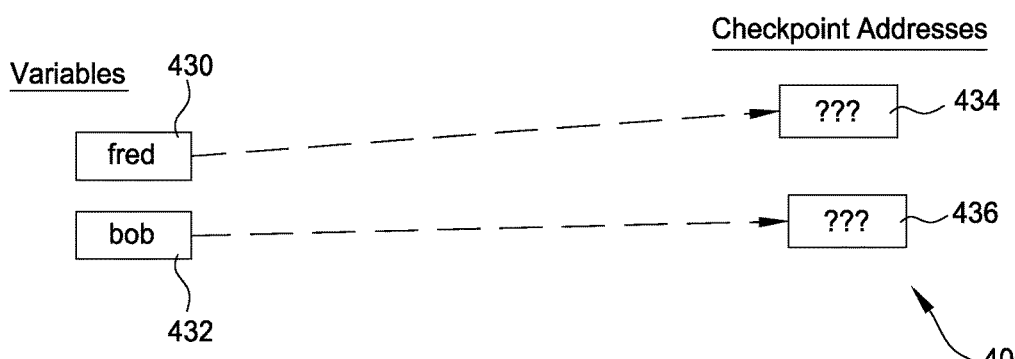

FIG. 4A illustrates a block diagram of writes by a list prefetcher 400 to memory addresses in a prefetch list 420 in L2 memory 406 during a first run of a computer program 402 running on a processor (e.g., processor 102a) according to the first portion of the process illustrated in FIG. 2B. In block 232, the computer program 402 begins execution for the first time. After the computer program 402 beginning to execute in block 232, the list prefetcher 400 (or processor or memory controller) can execute a cache flush in block 234. In various instances, the cache flush can occur before or simultaneously with the computer program beginning to execute. The computer program 302 first requests data from memory address "a." In block 238, the list prefetcher 400 can determine that the computer program 402 is requesting data from a memory address. Thus, moving to block 240, the list prefetcher 400 can determine whether the data from memory address "a" is already written to cache. In this case, the data from memory address "a" is not written to cache, so, in block 242, the list prefetcher 400 can write memory address "a" to the prefetch list 420. The L1 cache 404 (e.g., L1 cache 104a) can translate the virtual memory addresses "a" to a physical address "a'" (the locations in physical memory where the data associated with the virtual memory addresses actually resides). In this example, the list prefetcher 400 can write the physical memory address "a'" to memory address 0x1000 in the prefetch list 420. As used herein, memory addresses followed by an apostrophe designate a physical address and memory addresses without an apostrophe designate a virtual memory address. As described above, after writing memory address "a" to the prefetch list 420, the list prefetcher 400 can skip to block 248. Since the computer program 402 has not completed executing, the list prefetcher 400 can return to block 238. The computer program 402 next requests data from memory address "b." In block 238, the list prefetcher 400 can determine that the computer program 402 is requesting data from a memory address. Thus, moving to block 240, the list prefetcher 400 can determine whether the data from memory address "b" is already written to cache. In this case, the data from memory address "b" is not written to cache, so, in block 242, the list prefetcher 400 can write memory address "b" to the prefetch list 420. In this example, the list prefetcher 400 can write the physical memory address "b'" to memory address 0x1001 in the prefetch list 420. Again, after writing memory address "b" to the prefetch list 420, the list prefetcher 400 can skip to block 248. Since the computer program 402 has not completed executing, the process 230 can return to block 238. The computer program 402 next requests data from memory address "c." In block 238, the list prefetcher 400 can determine that the computer program 402 is requesting data from a memory address. Thus, moving to block 240, the list prefetcher 400 can determine whether the data from memory address "c" is already written to cache. In this case, the data from memory address "c" is not written to cache, so, in block 242, the list prefetcher 400 can write memory address "c" to the prefetch list 420. Here, the list prefetcher 400 can write the physical memory address "c'" to memory address 0x1002 in the prefetch list 420. Again, after writing memory address "c" to the prefetch list 420, the list prefetcher 400 can skip to block 248. Since the computer program 402 has not completed executing, the list prefetcher 400 can return to block 238. The computer program 402 next requests data from memory address "d." In block 238, the list prefetcher 400 determines that the computer program is requesting data from a memory address. Thus, moving to block 240, the list prefetcher 400 can determine whether the data from memory address "d" is already written to cache. In this case, the data from memory address "d" is not written to cache, so, in block 242, the list prefetcher 400 can write memory address "d" to the prefetch list 420. In this example, the list prefetcher 400 can write the physical memory address "d'" to memory address 0x1003 in the prefetch list 420. Again, after writing memory address "d" to the prefetch list 420, the list prefetcher 400 can skip to block 238. Since the computer program 402 has not completed executing, the list prefetcher 400 can return to block 248.

The computer program 402 next creates a checkpoint 414 by writing to a memory address that includes a variable labeled "fred" 430. In block 238, the list prefetcher 400 can determine that the computer program 402 is not requesting data from a memory address. Thus, the list prefetcher 400 can skip to block 244 of the process 230 to determine whether the computer program 402 has output a checkpoint. In block 244, the list prefetcher 400 can determine that the computer program 402 did output a checkpoint and move to block 246 of the process 230. As described above, at the beginning of the process 230, a cache flush can be performed to clear the cache. Thus, when the checkpoint 414 is output by the computer program 402, the data from the memory address 434 associated with the variable "fred" 430 is not stored in cache. Thus, in block 246, the list prefetcher 400 can write the variable "fred" 430 associated with the checkpoint 414 to the prefetch list 420 in the next-available memory space of the prefetch list (e.g., memory address 0x1004). After writing the variable "fred" 430 to the prefetch list 420, the list prefetcher 400 can move to block 248 of the process 230 to determine whether the computer program 402 has completed execution. Again, if the computer program 402 has not completed executing, then the list prefetcher 400 can return to block 238.

The computer program 402 next requests data from memory address "e." In block 238, the list prefetcher 400 can determine that the computer program 402 is requesting data from a memory address. Thus, moving to block 240, the list prefetcher 400 can determine whether the data from memory address "e" is already written to cache. In this case, the data from memory address "e" is not written to cache, so, in block 242, the list prefetcher 400 can write memory address "e" to the prefetch list 420. In this example, the list prefetcher can write the physical memory address "e'" to memory address 0x1005 in the prefetch list 420. Again, after writing memory address "e" to the prefetch list 420, the list prefetcher 400 can skip to block 248 in the process 230. Since the computer program 402 has not completed executing, the list prefetcher 400 can return to block 238 in the process 230. The computer program 402 next requests data from memory address "f." In block 238, the list prefetcher 400 can determine that the computer program 402 is requesting data from a memory address. Thus, moving to block 240, the list prefetcher 400 can determine whether the data from memory address "f" is already written to cache. In this case, the data from memory address "f" is not written to cache, so, in block 242, the list prefetcher 400 can write memory address "f" to the prefetch list 320. In this example, the list prefetcher 400 can write the physical memory address "f'" to memory address 0x1006 in the prefetch list 420. Again, after writing memory address "f" to the prefetch list 420, the list prefetcher 400 can skip to block 248 of the process 230. Since the computer program 302 has not completed executing, the list prefetcher 400 can return to block 238 of the process 230.

The computer program 402 next creates a checkpoint 416 by writing to a memory address 434 that includes a variable labeled "bob" 432. The variable "bob" 432 points to a memory address 436. In block 238, the list prefetcher 400 can determine that the computer program 402 is not requesting data from a memory address. Thus, the list prefetcher 400 can skip to block 244 of the process 230 to determine whether the computer program 402 has created a checkpoint. In block 244, the list prefetcher 400 can determine that the computer program 402 did create a checkpoint and move to block 246 of the process 230. As described above, at the beginning portion of the process 230, a cache flush can be performed to clear the cache. Thus, when the checkpoint 416 is output by the computer program 402, any data stored at the memory address 436 associated with the variable "bob" 432 is not stored in cache. Thus, in block 246, the list prefetcher 400 can write the variable "bob" 432 associated with the checkpoint 416 to the prefetch list 420 in the next-available memory space of the prefetch list (e.g., memory address 0x1007). After writing the variable "bob" 432 to the prefetch list 420, the list prefetcher 400 can move to block 248 of the process 230 to determine whether the computer program 402 has completed execution. Again, if the computer program 402 has not completed executing, then the list prefetcher 400 can return to block 238.

The computer program 402 next requests data from memory address "g." In block 238, the list prefetcher 400 can determine that the computer program 402 is requesting data from a memory address. Thus, moving to block 240, the list prefetcher 400 can determine whether the data from memory address "g" is already written to cache. In this case, the data from memory address "g" is not written to cache, so, in block 242, the list prefetcher 400 can write memory address "g" to the prefetch list 420. In this example, the list prefetcher can write the physical memory address "g'" to memory address 0x1008 in the prefetch list 420. Again, after writing memory address "g" to the prefetch list 420, the list prefetcher 400 can skip to block 248 in the process 230. For illustration purposes, if the computer program 402 completes execution after requesting data from memory address "g", then the list prefetcher 400 can move to the second portion of the process 230, which starts with block 254.

Figure 4B:
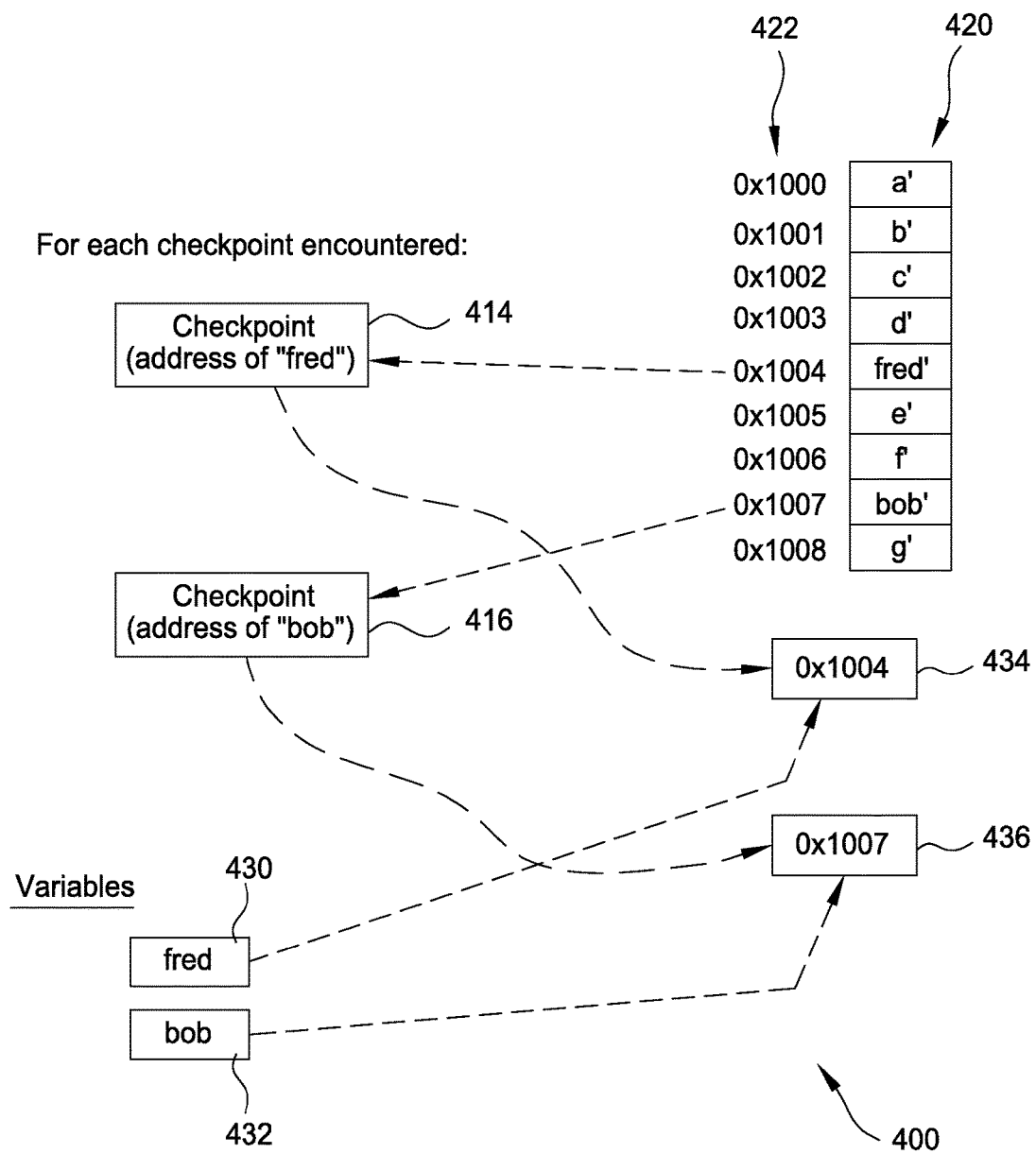
FIG. 4B is a block diagram that shows exemplary write operations to memory addresses associated with checkpoints according to the second process illustrated in FIG. 2B.

Up to this point, the values and/or data stored at the physical addresses 434 and 436 of "fred" and "bob," respectively, have been unimportant. The memory of the physical addresses 434 and 436 could be empty, filled with a random value, or all set to the same value, for example. Referring now to FIGS. 2B and 4B, after the computer program 402 has completed its first execution, the list prefetcher 400 can go through all of the checkpoint variables read by the computer program 402. In block 254, the list prefetcher 400 can first search the generated prefetch list 420 for the variable "fred" (associated with a virtual memory address). The list prefetcher 400 can translate (or have translated) the virtual address "fred" to the physical address "fred'." The list prefetcher 400 can then review the prefetch list 420 to see if any entries in the prefetch list 420 match "fred'." In this example, memory address 0x1004 matches "fred'." As a result, in block 256, the list prefetcher 400 can write the address 0x1004 to the physical memory address 434 associated with the virtual memory variable "fred." In block 258, the list prefetcher 400 can determine that it has not found all of the checkpoint variables, so the list prefetcher 400 can return to block 254. Next, in block 254, the list prefetcher 400 can first search the generated prefetch list 420 for the variable "bob" (associated with a virtual memory address). The list prefetcher 400 can translate (or have translated) the virtual address "bob" to the physical address "bob'." The list prefetcher 400 can then review the prefetch list 420 to see if any entries in the prefetch list 420 match "bob'." In this example, memory address 0x1007 matches "bob'." As a result, in block 256, the list prefetcher 400 can write the address 0x1007 to the physical memory address 436 associated with the virtual memory variable "bob." For illustration purposes, if "bob" is the last checkpoint variable, then in block 258, the list prefetcher 400 can move to block 262 and end the process 230.

Figure 4C:
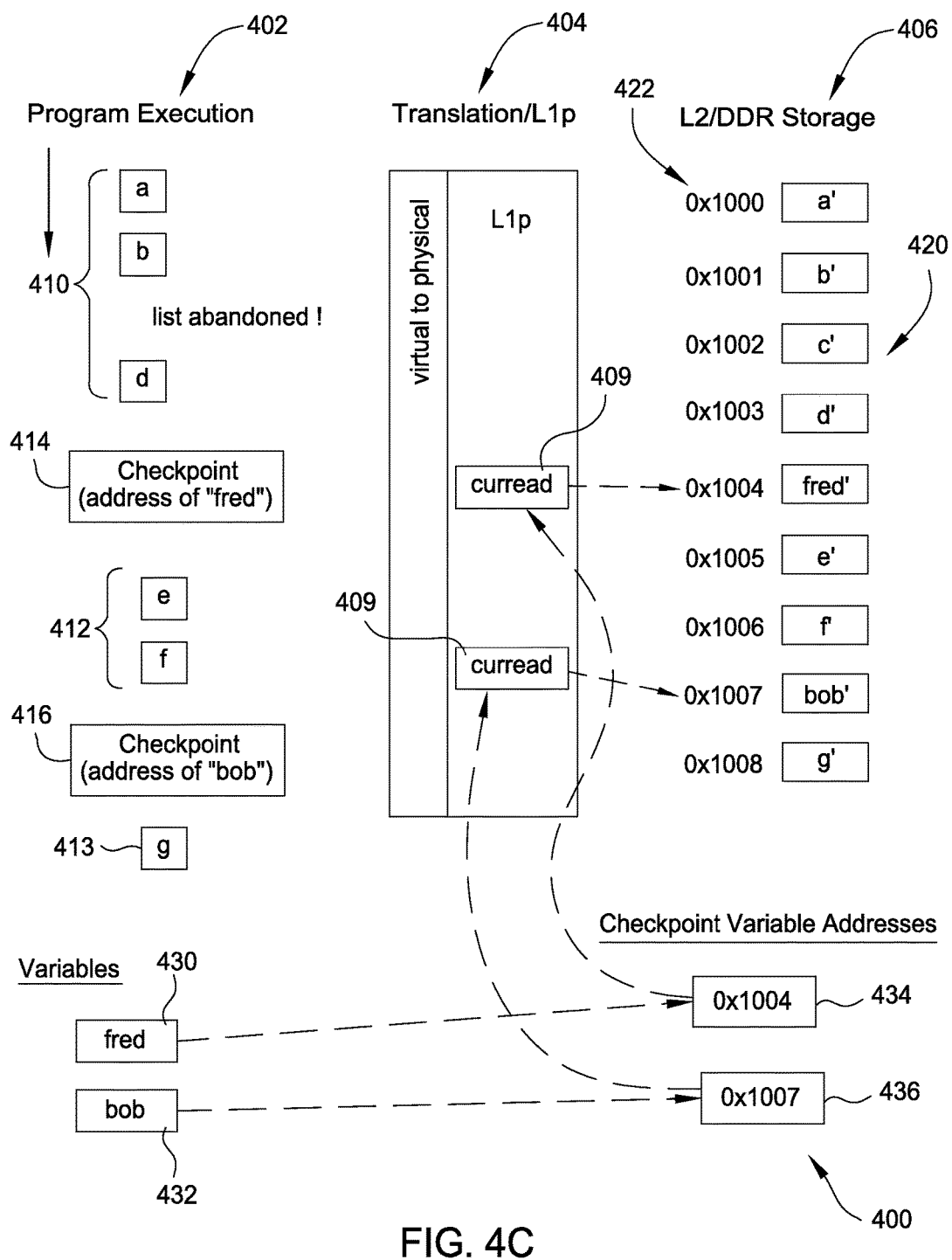
FIG. 4C is a block diagram that shows exemplary reads from memory addresses associated with checkpoints according to the process illustrated in FIG. 2C.

Referring now to FIGS. 2C and 4C, in subsequent executions of the computer program 402 (block 272), the list prefetcher 400 can monitor the execution of the computer program 402 to ensure that the prefetch list 420 is tracking the computer program 402. Before the computer program 402 starting execution at block 272, the list prefetcher 400 can write a first portion of the prefetch list 420 to cache (as described above). In block 276, the list prefetcher 400 can determine whether the portion of the prefetch list 420 pulled into cache is tracking the memory addresses requested by the computer program 402. Put differently, the list prefetcher 400 can determine whether the memory addresses requested by the computer program 402 are contained in the portion of the prefetch list 420 that has been stored in cache. If the list prefetcher 400 gets lost because the prefetch list 420 does not track the memory addresses requested by the computer program 402, then, in block 282, the list prefetcher 400 can wait for the computer program 402 to output a checkpoint. For example, if the list prefetcher 400 is lost and the computer program 402 subsequently outputs the variable "fred" 430, then the list prefetcher 400 can look at the memory address 434 associated with "fred" 430. The list prefetcher 400 can see that the memory address 434 is storing the value 0x1004. The list prefetcher 400 can therefore set the value of curread 409 (current read level) in the L1 cache 404 to 0x1004 so that curread 409 is again tracking the prefetch list 320. The list prefetcher 400 can also pull into cache a portion of the prefetch list 420 that includes the memory address stored at "fred". For example, the list prefetcher 400 may pull into cache a portion of the prefetch list 420 that begins with the memory address stored at "fred." As another example, the list prefetcher 400 may pull into cache a portion of the prefetch list 420 that includes the memory address stored at "fred" approximately centered within the portion. As yet another example, the list prefetcher 400 may pull into a cache a portion of the prefetch list 420 that immediately follows the memory address stored at "fred."

Referring again to block 276, if the prefetch list 420 is tracking the memory address requests from the computer program 402, then the list prefetcher 400 can move to block 278 to determine whether the computer program 402 has finished executing. If so, then the process 270 can end at block 284. If the computer program 402 has not finished executing, then the list prefetcher 400 can incrementally adjust the portion of the prefetch list 420 written to cache. For example, as the list prefetcher 400 tracks successive memory address requests from the computer program 402 that are in the prefetch list 420, the list prefetcher 400 can drop the first memory address of the prefetch list 420 from cache and add the next memory address from the prefetch list 420 to cache. Referring to FIG. 4A for illustration purposes, the list prefetcher 400 may drop from cache the memory address 1x1000 from the prefetch list 420 and add the next memory address 1x1009 from the prefetch list to cache.

The list prefetcher 400 tracks a generated prefetch list and recovers after becoming lost in a manner similar to the list prefetcher 300 described in FIG. 3A or the list prefetcher 350 described in FIG. 3B. However, the list prefetcher 400 described in FIGS. 4A-4C may run faster and/or more efficiently during the first execution of a computer program than the list prefetcher 300 described in FIG. 3A or the list prefetcher 350 described in FIG. 3B because the list prefetcher 400 does not use compute cycles during the computer program execution to create the associations between the checkpoints (e.g., "fred" 414 and "bob" 416) and addresses in the prefetch list 420 during the first execution of the computer program 402. Instead, the associations are created after the computer program 402 is executed. The performance benefits of the list prefetcher 400 described in FIGS. 4A-4C may be beneficial, for example, for a computer program that is part of a multi-threaded application. In such multi-threaded applications, timing among multiple computer programs can be important, and a delay in one program may cause an inordinately long delay in a second program.

In the examples above, the list prefetchers 300, 350 and 400 are described as performing the operations of generating the prefetch lists, generating checkpoints (or variables), and creating associations between the checkpoints (or variables) and the prefetch list. In various embodiments, applications and/or processes other than the list prefetchers can perform these various operations.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing is directed to embodiments of the present invention, other and further embodiments of the invention may be devised without departing from the basic scope thereof, and the scope thereof is determined by the claims that follow.

What is claimed is:

1. A method comprising:
performing a first execution of a computer program, wherein the computer program outputs checkpoint indications, wherein each checkpoint indication corresponds to a different execution point of the computer program;
generating a prefetch list, wherein each item in the prefetch list corresponds to a cache miss during the first execution of the computer program, and, upon output of a checkpoint indication by the computer program, creating an association between a location in the prefetch list and the output checkpoint indication;
upon a subsequent execution of the computer program:
loading a first portion of the prefetch list into a cache; and
upon determining that the prefetch list is not tracking the subsequent execution of the computer program:
receiving a checkpoint indication from the computer program;
tracking a location in the prefetch list associated with the received checkpoint indication; and
loading into the cache a second portion of the prefetch list that includes the tracked location.

2. The method of claim 1, wherein the location in the prefetch list associated with the output checkpoint indication is a location in the prefetch list immediately following a location in the prefetch list corresponding to the last cache miss prior to the output of the checkpoint indication by the computer program.

3. The method of claim 1, wherein each output checkpoint indication comprises an ordering indication, wherein the location in the prefetch list comprises a memory address of a portion of the prefetch list, and wherein creating the association between the location in the prefetch list and the output checkpoint indication comprises storing the memory address of the portion of the prefetch list in a position in a tracking array corresponding to the ordering indication.

4. The method of claim 1, wherein each output checkpoint indication comprises a pointer to a memory location, wherein the location in the prefetch list comprises a memory address of a portion of the prefetch list, and wherein creating the association between the location in the prefetch list and the output checkpoint indication comprises storing the memory address of the portion of the prefetch list into the memory location associated with the pointer.

5. The method of claim 1, wherein each checkpoint association comprises a memory address request by the computer program that will generate a cache miss such that the requested memory address is added to the prefetch list being generated, and wherein creating the association between the location in the prefetch list and the output checkpoint indication comprises writing to the requested memory address the location of the cache miss in the prefetch list generated by the memory request.

6. The method of claim 5, further comprising:
upon the subsequent execution of the computer program and upon determining that the prefetch list is not tracking the subsequent execution of the computer program:
receiving the memory address request by the computer program; and
tracking to the location of the prefetch list stored in the requested memory address.

* * * * *